(12) United States Patent
Singh et al.

(10) Patent No.: US 7,142,538 B2
(45) Date of Patent: Nov. 28, 2006

(54) MESSAGE-BASED COMMUNICATION OVER BUS BETWEEN CARDS IN AN ELECTRONIC MODULE

(75) Inventors: Ashok Kumar Singh, Irvine, CA (US); Lin Wu, Sunnyvale, CA (US); Dapeng Xiong, Irvine, CA (US); Celine Yonghong Wang, Irvine, CA (US)

(73) Assignee: ADC DSL Systems, Inc., Eden Praire, MN (US)

( * ) Notice: Subject to any disclaimer, the term of this patent is extended or adjusted under 35 U.S.C. 154(b) by 958 days.

(21) Appl. No.: 10/027,926

(22) Filed: Dec. 22, 2001

(65) Prior Publication Data

US 2003/0123441 A1    Jul. 3, 2003

(51) Int. Cl.
*H04L 12/28* (2006.01)
*H04L 12/56* (2006.01)

(52) U.S. Cl. ..................... 370/392; 370/395.1

(58) Field of Classification Search ............. 370/395.1, 370/395.52, 469, 473, 474
See application file for complete search history.

(56) References Cited

U.S. PATENT DOCUMENTS

| 6,049,531 A * | 4/2000 | Roy ..................... 370/395.53 |
| 6,307,857 B1 * | 10/2001 | Yokoyama et al. .... 370/395.72 |
| 6,795,445 B1 * | 9/2004 | Kabie et al. ............... 370/401 |

* cited by examiner

*Primary Examiner*—Brian Nguyen
(74) *Attorney, Agent, or Firm*—Fogg and Associates LLC; David N. Fogg

(57) ABSTRACT

A method for communicating between cards in an electronic module is provided. The method includes generating a message for transmission at a first card. The message is transmitted over a bus to a second card by-passing an IP stack at the first card. A queue at the second card is monitored for messages from the first card. A message is read from the queue at the second card when received from the first card.

10 Claims, 2 Drawing Sheets

MESSAGE-BASED COMMUNICATION OVER BUS BETWEEN CARDS IN AN ELECTRONIC MODULE

TECHNICAL FIELD

The present invention relates to the field of electronics, and in particular, to a message-based communication over a bus between cards in an electronic module.

BACKGROUND

The demand for electronic communication of data has exploded in recent years. A variety of technologies have been developed to meet this demand. These technologies deliver data at ever increasing speeds. One technology for delivering data is referred to as digital subscriber line (DSL) technology. DSL technology encompasses a variety of technologies including but not limited to asymmetric digital subscriber line (ADSL), symmetric digital subscriber line (SDSL) including G.SHDSL, high bit rate digital subscriber line (HDSL), very high bit rate digital subscriber line VHDSL, and rate adaptive digital subscriber line (RDSL). In each case, DSL technology delivers high speed digital transmission over existing telephone lines, e.g., twisted copper pairs.

DSL technology typically communicates digital data between cusotmer premises equipment (CPE) and a data network. The customer premises equipment is commonly referred to as a DSL modem or an integrated access device. The data network typically comprises an Asynchronous Transfer Mode (ATM) network or other appropriate data network. DSL technology uses a device known as a digital subscriber line access multiplexer (DSLAM) to facilitate the connection between the customer premises equipment and the data network.

The DSLAM is located, for example, at a central office of the telephone company. A conventional DSLAM includes a number of different cards or boards in a rack or housing. In one conventional approach, the DSLAM includes at least one line card that provides connection to the data network over one or more high capacity lines, e.g., an OC-3 line, a DS-3 line or other appropriate high capacity line. The DSLAM also includes a control card that controls the operation of the DSLAM, e.g., allows configuration, monitoring and control of the DSLAM. Further, the DSLAM also includes a number of channel cards, e.g., cards that provide connection to a number of modems over a number of telephone lines or twisted pairs.

The various boards or cards of the DSLAM communicate with each other to connect the customer premises equipment with the data network. This intra-DSLAM communication is accomplished over a cell bus that typically resides on a backplane in the rack of the DSLAM. This cell bus is used to carry traffic between cards, e.g., between line cards and the channel cards, in the DSLAM to effectuate communication to and from modems.

The cell bus is also used to carry other communications between cards in the DSLAM. For example, inter-board communication has typically been accomplished between the control card and the other cards over a dedicated VPI on the cell bus using private IP addresses.

Many functions have been typically carried out on a single board in the DSLAM. However, to improve performance of some of these functions, it is desirable to split the functionality between multiple cards in the DSLAM. For example, traffic management has typically been performed in line cards. It would be desirable to perform traffic management using multiple cards, e.g, the line card and a channel card. Unfortunately, functions like traffic management are often time critical and conventional inter-board communication may not be fast enough to allow splitting of the functionality between multiple cards. Therefore, there is a need in the art for faster communication between boards in a DSLAM to allow splitting of functionality between cards.

SUMMARY

Embodiments of the present invention address problems with communication between cards in an electronic module. Specifically, communication between applications running on different cards are handled in an expedited manner by by-passing the IP stack when communicating over a bus, e.g., a cell-based bus. Selected applications are allowed to communicate with applications running on other cards in a message-based format without the need for passing messages through the IP stack with other traffic.

In particular, in one embodiment, a method for communicating between cards in an electronic module is provided. The method includes generating a message for transmission at a first card. The message is transmitted over a bus to a second card by-passing an IP stack at the first card. A queue at the second card is monitored for messages from the first card. A message is read from the queue at the second card when received from the first card.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide for communicating between applications running on separate cards in an electronic module, e.g., a digital subscriber line access multiplexer (DSLAM), over a bus by-passing the IP stack. Advantageously, functionality of the electronic module can be split between applications running on different cards in the electronic module due to the increased communication speed of the message-based communication protocol.

Figure 1:
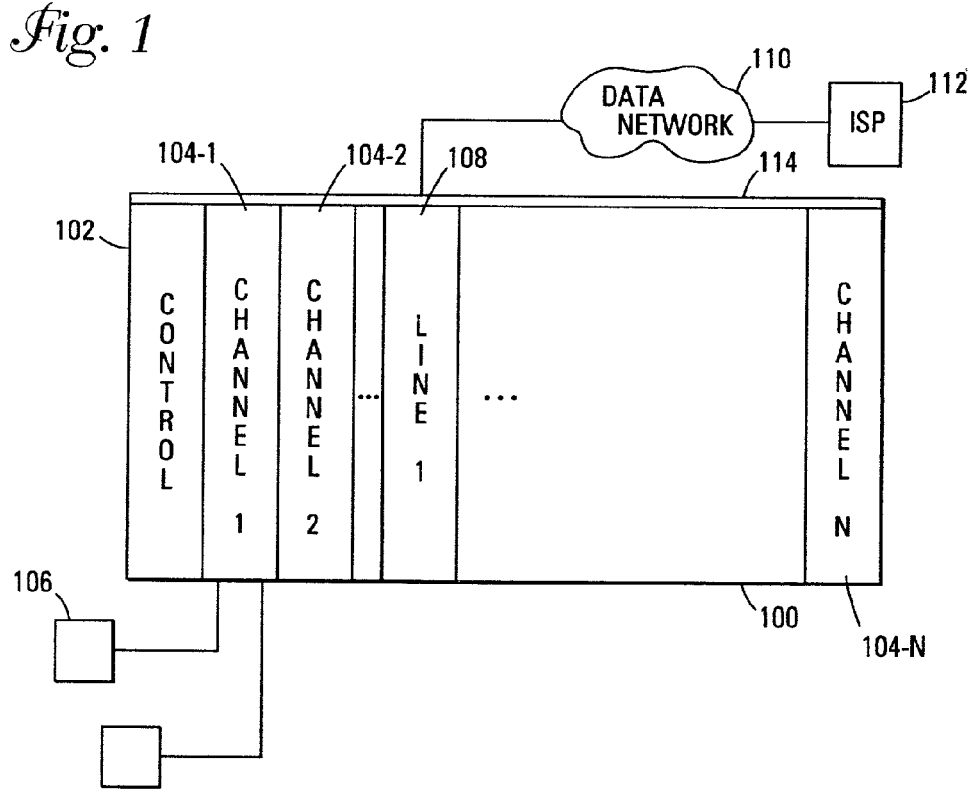
FIG. 1 is a block diagram of an embodiment of an electronic module with improved inter-board communication according to the teachings of the present invention.

FIG. 1 is a block diagram of an embodiment of an electronic module, indicated generally at 100, with improved inter-board communication according to the teachings of the present invention. Electronic module 100, in one embodiment, comprises a digital subscriber line access multiplexer (DSLAM) that uses an enhanced message-based communication protocol to communicate between applications running on different cards in module 100.

Module 100 includes a plurality of cards. In one embodiment, module 100 includes control card 102. Control card 102 is used to control the operation of module 100. For example, control card 102 controls the configuration and management of the other cards in module 100. Module 100 further includes channel cards 104-1 to 104-N. Channel cards 104-1 to 104-N provide for terminating communication lines between module 100 and customer premises equipment 106, e.g., modems. Channel cards 104-1 to 104-N support any of a number of digital subscriber line services. For example, in one embodiment, channel cards 104-1 to 104-N support ADSL, SDSL, HDSL, VHDSL, RDSL, G.SHDSL, and any other appropriate form of digital subscriber line service. Module 100 also includes at least one line card 108 that provides a connection to a data network, e.g., data network 110. Modems 106 communicate, for example, with a selected Internet service provider (ISP) 112 coupled to network 110 through module 100. Line cards 108 support any of a number of different high capacity communication protocols. For example, in one embodiment, line cards 108 support one or more of OC-3, DS-3 or other appropriate high capacity communication protocol.

Module 100 allows communication between the channel cards 104-1 to 104-N, control card 102 and line card 108 over bus 114. In one embodiment, bus 114 is a cell bus for communication using ATM cells. Bus 114 communicates both data cells that are routed through module 100 as well as cells containing messages sent between applications running on separate cards.

In operation, communication of messages between cards of module 100 is accomplished through messages-based communication that bypasses the IP stack on the cards of module 100. An example of this message based communication is between applications residing on line card 108 and channel card 104-1. In one embodiment, a connection admission control (CAC) application runs on line card 108 and on channel card 104-1. This and other applications are used to implement aspects of traffic management. In one aspect, the CAC application is used to determine whether to allow a new virtual connection to be established. A portion of the CAC application runs on line card 108 while another portion of the CAC application runs on channel card 104-1. To determine whether to allow a connection to be established, the CAC application on line card 108 sends a message to the CAC application running on channel card 104-1 over bus 114 using a protocol that bypasses the IP stack on line card 108. This allows the communication to be accomplished in a more expedited manner. In one embodiment, the message requests data from channel card 104-1 that is used by the CAC application on line card 108 in determining whether to allow the connection to be established. Channel card 104-1 responds to the request with the needed information in a message that is also communicated over bus 114 bypassing the IP stack of channel card 104-1.

Figure 2:
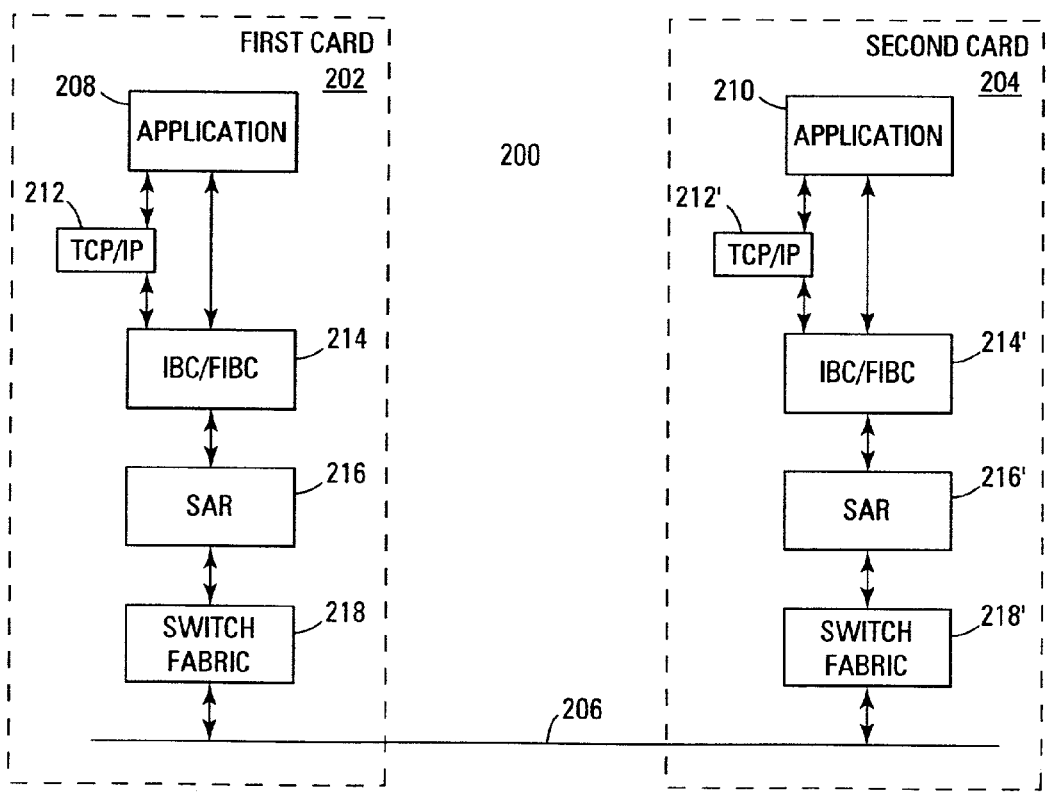
FIG. 2 is a data flow diagram illustrating one embodiment of modules for communicating between boards of an electronic module according to the teachings of the present invention.

FIG. 2 is a data flow diagram illustrating one embodiment of modules for communicating between cards 202 and 204 of an electronic module, indicated generally at 200, according to the teachings of the present invention. In one embodiment, cards 202 and 204 each comprise one of a line card, a channel card and a control card of a digital subscriber line access multiplexer. Cards 202 and 204 include application programs 208 and 210, respectively, that communicate using a message-based protocol over bus 206. In one embodiment, bus 206 comprises a bus that carries traffic as ATM cells.

First and second cards 202 and 204 include a number of different modules that work together to pass messages back and forth between applications 208 and 210. These modules also are used in appropriate combinations to pass cells that transport IP packets to selected cards over bus 206. Due to the similarities between the two cards, only first card 202 is described in detail. Further, the specific example provided is described in terms of a message being passed from first card 202 to second card 204. It is understood that messages are in fact communicated in both directions.

First card 202 includes application 208. In one embodiment, application 208 comprises one of a CAC application, an SNMP application, a Telnet application, and an FTP application. It is understood by one of ordinary skill in the art that other appropriate applications can also run on first card 202. Application 208 is in communication with both a TCP/IP stack 212 (IP stack 212) and an inter-board communication (IBC) and fast inter-board communication (FIBC) driver 214. Driver 214 determines the appropriate destination for messages and data packets. Driver 214 communicates IP packets with TCP/IP stack 212 and communicates messages with application 208. Driver 214 also communicates with segmentation and reassembly (SAR) module 216. SAR module 216 segments packets into cells for application to bus 206 and re-assembles data from cells on bus 206 into packets. SAR 216 communicates with bus 206 through switch fabric 218.

In operation, a message is passed from application 208 to application 210. For example, application 208 comprises a CAC application that requests statistical information from application 210. This message is provided to a queue in driver 214, thereby bypassing IP stack 212. Driver 214 provides the message to SAR 216 and the message is passed over an appropriate virtual channel (VPI/VCI) to second card 204 as a plurality of cells depending on the length of the message. At second card 204, switch fabric 218' receives the cells that make up the message. SAR 216' reassembles the data from the cells into the message packet. This is provided to a queue in driver 214' assigned to application 210. Application 210 periodically monitors the queue and reads out the message thus bypassing the IP stack 212'. Application 210 takes appropriate action, e.g., generating a response, based on the received message.

Figure 5:
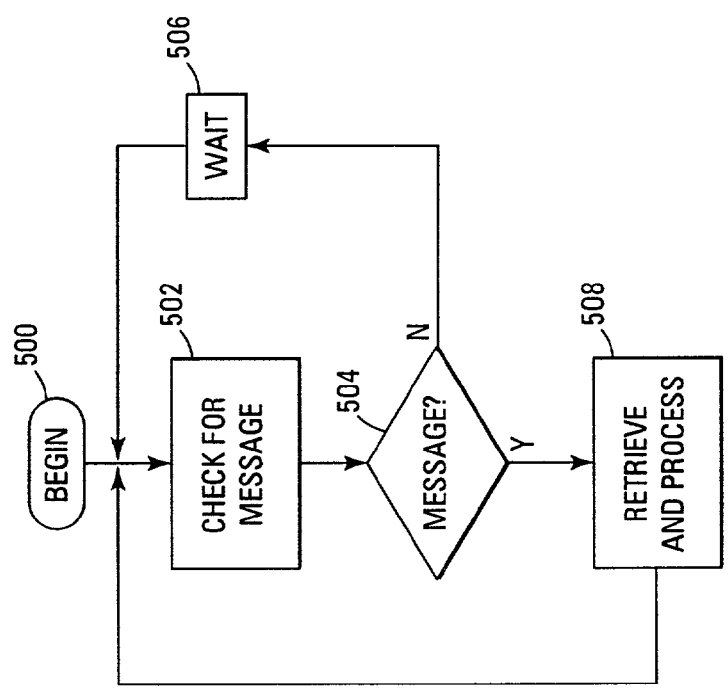
FIGS. 3, 4, and 5 are flow charts of embodiments of processes used in communicating between boards in an electronic module according to the teachings of the present invention.
Figure 4:
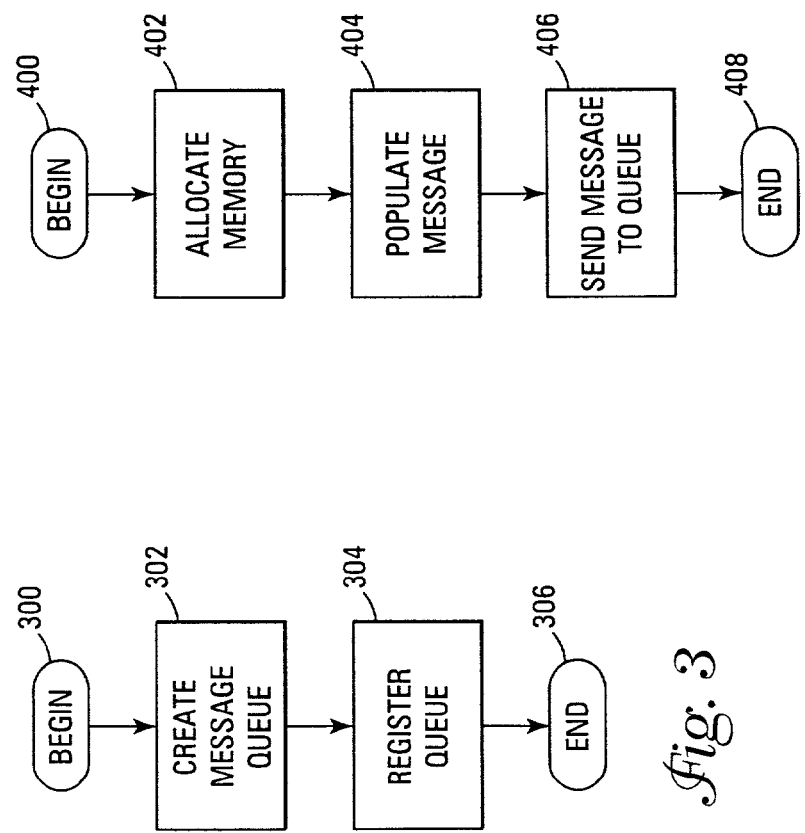
Figure 3:
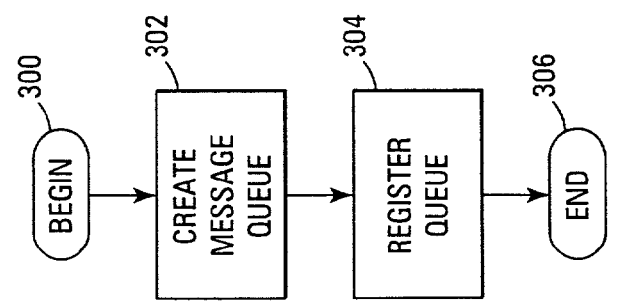

FIGS. 3, 4, and 5 are flow charts of embodiments of processes used in communicating between boards in an electronic module according to the teachings of the present invention. In one embodiment, each of these processes work together to control the flow of messages between applications on different cards while by-passing the IP stack. Each of the processes is described in turn.

FIG. 3 is an embodiment of a process for initializing a message queue in an IBC/FIBC driver such as drivers 214 and 214α of FIG. 2. The process begins at 300. At 302, the process creates a message queue. In one embodiment, the following routine represented in code is used to specify the parameters of the queue:

```
msgQId = msgQCreate(maxMsgs,    /* the max messages that can be queued */
                   sizeof (char *),  /* max bytes in a message*/
                   int options     /* message queue options: MSG_Q_FIFO */
``` in which msgQId is the indentification for the new queue. At block 304, the new queue is registered with the IBC/FIBC driver. In one embodiment, this is accomplished with the following routine:

fibcIdRegister(APP_ID, msgQId)

In this call, the variable APP_ID is used to identify the application that is associated with the queue. The APP_ID was previously created and identifies one of the applications running on the card. At block 306 the method of initialization ends.

FIG. 4 is an embodiment of a process for the sending side of the message-based communication. The method begins at block 400. At block 402, the method allocates memory for the message to be created by the application. This allocation process is accomplished by calling a procedure such as fibcMalloc(msgLen) in which msgLen indicates the length of the message.

At block 404, the method proceeds to populate the message with data. This message is now ready to be sent. The method next sends the message to a queue in the driver at block 406 using a procedure call such as appSendMsg (srcAppId, dstAppId, srcSlot, dstSlot, msgLen, pMsg). AppSendMsg is an API that is defined as follows:
U8 appSendMsg

```
(
U8 srcAppId,    /* the application id of the source */
U8 dstAppId,    /* the application id of the destination */
U8 srcSlot,     /* the source slot id */
U8 dstSlot,     /* the destination slot id */
U16 length,     /* the length of the message sent by application */
Void *pMsg      /* the pointer of the message */
);
```

Based on the information provided, the IBC/FIBC driver sends the message over the bus to the other card thereby bypassing the IP stack. Included in the message is an FIBC header as follows:

```
_fibcHdr {
    U8 srcAppId;    /* source application id */
    U8 dstAppId;    /* destination application id */
    U8 srcSlot;     /* source slot id */
    U8 dstSlot;     /* destination slot id */
    U16 length;     /* the length of the whole FIBC message
                       header+payload)*/
    U16 reserved;   /* reserved */
} FIBC_HDR, * pFIBC_HDR;
```

Based on the information provided, the FIBC driver of the other card places the message in the appropriate queue for the designated application.

FIG. 5 is an embodiment of a process for reading out a message received over a bus and bypassing the IP stack. The method begins at block 500. At block 502, the method checks for a message in the queue for the application. In one embodiment, this is accomplished with the following procedure call:

```
int msgQReceive
    (
    MSG_Q_ID msgQId,  /* message queue from which to receive */
    char *   buffer,  /* buffer to receive message */
```

```
    UINT    maxNBytes,  /* sizeof (char *) */
    int     timeout     /* ticks to wait */
    )
```

At block 504 the method determines whether there is a message in the queue. If not the message waits a specified time at block 506 and then returns to block 502. At block 504, if it is determined that a message is waiting, the method proceeds to retrieve and process the message at block 508. The messages is removed from the queue. The method returns to block 502 and looks for additional messages.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A method for communicating between cards in an electronic module, the method comprising:
   generating a message for transmission from an application at a first card in the electronic module;
   transmitting the message over a bus to an associated application at a second card in the same electronic module by-passing an IP stack located between an application layer and an interboard communication layer at the first card;
   monitoring a queue at the second card for messages from the first card; and
   reading a message from the queue at the second card when received from the first card.

2. The method of claim 1, wherein transmitting the message comprises transmitting the message over a cell bus.

3. The method of claim 1, wherein generating a message for transmission comprises generating a message for transmission between an application on the first card and an application on the second card.

4. The method of claim 1, wherein generating the message for transmission comprises:
   allocating memory for the message;
   populating the memory with the message; and
   placing the message in a queue for transmission.

5. The method of claim 1, and further comprising creating and registering the queue at the second card for a selected application.

6. A method for communicating between cards in an electronic module, the method comprising:
   generating a message for transmission from an application at a first card in the electronic module to an associated application at a second card in the same electronic module;
   transmitting the message over a cell-based bus as a message to the second card by-passing an IP stack;
   queuing the message in a queue for the associated application at the second card;.
   monitoring the queue at the second card for messages from the first card; and
   reading a message from the queue at the second card when received from the first card.

7. A method for communicating between cards in a digital subscriber line access multiplexer (DSLAM), the method comprising:
- generating a message for transmission from an application at a first card in the DSLAM to an associated application at a second card in the same DSLAM;
- by-passing the IP for the message;
- queuing the message at the first card;
- transmitting the message over a cell-based bus as a message to the second card;
- queuing the message in a queue for the associated application at the second card;
- monitoring the queue at the second card for messages from the first card; and
- reading the message from the queue at the second card when received from the first card.

8. The method of claim 7, wherein generating a message comprises generating a request by a connection admission control (CAC) application in the first card for data from a CAC application in the second card for use by the CAC application in the first card.

9. An electronic module, comprising:
- a first card including at least one application running on the first card;
- a second card including at least one related application running on the second card;
- a bus, communicatively coupled to both first and the second cards;
- wherein communication between the at least one application on the first card and the at least one application on the second card is accomplished by messages passed over the bus between the first and second cards by-passing an IP stack located between an application layer and an inter-board communication layer on the first and second cards.

10. An electronic module, comprising:
- a first card including at least one application running on the first card;
- a second card including at least one related application running on the second card;
- a bus, communicatively coupled to both the first and the second cards;
- wherein communication between the at least one application on the first card and the at least one application on the second card is accomplished by an inter-card communication module that selectively queues messages communicated between the first card and the second card so as to by-pass the IP stack of the first card.

* * * * *